US012744733B2

(12) United States Patent
Defilippi et al.

(10) Patent No.: US 12,744,733 B2
(45) Date of Patent: Sep. 22, 2026

(54) DOMAIN BORDER ROUTER RESILIENCY WITH SEGMENT COMPACTION

(71) Applicant: Ciena Corporation, Hanover, MD (US)

(72) Inventors: Todd Defilippi, Redwood City, CA (US); Amal Karboubi, Ottawa (CA)

(73) Assignee: Ciena Corporation, Hanover, MD (US)

(*) Notice: Subject to any disclaimer, the term of this patent is extended or adjusted under 35 U.S.C. 154(b) by 56 days.

(21) Appl. No.: 18/776,125

(22) Filed: Jul. 17, 2024

(65) Prior Publication Data

US 2026/0025331 A1 Jan. 22, 2026

(51) Int. Cl.
*H04L 45/74* (2022.01)
*H04L 45/02* (2022.01)

(52) U.S. Cl.
CPC .............. *H04L 45/74* (2013.01); *H04L 45/02* (2013.01)

(58) Field of Classification Search
CPC ................................ H04L 45/74; H04L 45/02
See application file for complete search history.

(56) References Cited

U.S. PATENT DOCUMENTS 7,120,792 B1 * 10/2006 Jacobson .............. H04L 9/3271 713/153
7,197,573 B1 * 3/2007 Jacobson ................ H04L 45/38 709/239
7,539,191 B1 * 5/2009 Jacobson ............ H04L 63/1441 370/392
8,135,834 B1 * 3/2012 Jacobson ................ H04L 45/24 709/226
8,274,901 B1 * 9/2012 Casner .............. H04M 15/8044 370/216
(Continued)

FOREIGN PATENT DOCUMENTS

EP 3 813 310 A1 4/2021
WO 2021067231 A1 4/2021
(Continued)

OTHER PUBLICATIONS

Cisco, "Segment Routing Configuration Guide for Cisco 8000 Series Routers, IOS XR Release 7.9.x", Mar. 13, 2023; https://www.cisco.com/c/en/us/td/docs/iosxr/cisco8000/segment-routing/79x/b-segment-routing-cg-cisco8000-79x.html (Year: 2023).*
(Continued)

*Primary Examiner* — Jimmy H Tran
(74) *Attorney, Agent, or Firm* — Baratta Law PLLC; Lawrence A. Baratta, Jr.

(57) ABSTRACT

Systems and methods for domain Border Router (BR) resiliency with segment compaction in Segment Routing include obtaining a compressed segment list for a calculated path in a Segment Routing network, wherein the Segment Routing network includes a plurality of domains with the calculated path being through at least two domains, wherein the compressed segment list includes a plurality of Segment Identifiers (SID) each SID identifying a segment, and wherein, when expanded, the compressed segment list matches the calculated path; analyzing the compressed segment list for any domain border routers between two domains of the at least two domains to determine associated anycast SID for the any domain border routers; and utilizing the associated anycast SID in the compressed SID list for resiliency between the two domains.

18 Claims, 3 Drawing Sheets

(56) References Cited

U.S. PATENT DOCUMENTS

| | | | | |
|---|---|---|---|---|
| 8,422,502 | B1 * | 4/2013 | Alaettinoglu | H04L 45/38 370/395.3 |
| 8,824,331 | B1 | 9/2014 | Alaettinoglu et al. | |
| 8,937,946 | B1 * | 1/2015 | Kanna | H04L 41/0853 370/254 |
| 9,026,674 | B1 * | 5/2015 | Kanna | H04L 43/062 709/239 |
| 9,929,946 | B2 * | 3/2018 | Filsfils | H04L 45/58 |
| 10,033,623 | B2 * | 7/2018 | Jain | H04L 67/568 |
| 10,171,338 | B2 * | 1/2019 | Filsfils | H04L 45/03 |
| 10,887,225 | B1 * | 1/2021 | Chan | H04L 45/34 |
| 10,917,330 | B1 * | 2/2021 | Szarecki | H04L 45/507 |
| 10,984,316 | B2 * | 4/2021 | Qiao | G06N 3/08 |
| 11,025,545 | B2 * | 6/2021 | Enguehard | H04L 47/787 |
| 11,057,278 | B1 * | 7/2021 | Côté | H04L 41/16 |
| 11,133,958 | B2 * | 9/2021 | Torvi | H04L 41/12 |
| 11,134,002 | B2 * | 9/2021 | Filsfils | H04L 45/50 |
| 11,240,145 | B2 * | 2/2022 | Kashyap | H04L 45/50 |
| 11,271,854 | B2 * | 3/2022 | Yadav | H04L 45/50 |
| 11,336,569 | B2 * | 5/2022 | Arora | H04L 45/34 |
| 11,438,259 | B2 * | 9/2022 | Torvi | H04L 45/04 |
| 11,546,246 | B2 * | 1/2023 | Szarecki | H04L 45/748 |
| 11,563,675 | B2 * | 1/2023 | Shah | H04L 45/507 |
| 11,757,757 | B2 * | 9/2023 | Alaettinoglu | H04L 45/42 709/238 |
| 11,838,200 | B2 * | 12/2023 | Filsfils | H04L 45/741 |
| 11,949,584 | B2 * | 4/2024 | Saad | H04L 45/50 |
| 12,476,907 | B2 * | 11/2025 | Shah | H04L 45/507 |
| 2014/0369238 | A1 * | 12/2014 | Alaettinoglu | H04L 41/0853 370/255 |
| 2016/0057049 | A1 * | 2/2016 | Jacobson | H04L 45/02 370/392 |
| 2021/0014084 | A1 * | 1/2021 | Torvi | H04L 12/437 |
| 2021/0083963 | A1 * | 3/2021 | Szarecki | H04L 45/04 |
| 2021/0099378 | A1 * | 4/2021 | Alaettinoglu | H04L 45/70 |
| 2021/0266251 | A1 * | 8/2021 | Yadav | H04L 45/28 |
| 2022/0014460 | A1 * | 1/2022 | Filsfils | H04L 45/52 |
| 2022/0086078 | A1 * | 3/2022 | Sivabalan | H04L 45/34 |
| 2022/0103462 | A1 * | 3/2022 | Sidebottom | H04L 45/02 |
| 2023/0067946 | A1 * | 3/2023 | Alaettinoglu | H04L 45/22 |
| 2023/0095297 | A1 * | 3/2023 | Alaettinoglu | H04L 45/645 370/225 |
| 2023/0098528 | A1 * | 3/2023 | Alaettinoglu | H04L 45/02 709/238 |
| 2023/0120019 | A1 * | 4/2023 | Shah | H04L 12/4633 370/389 |
| 2023/0146226 | A1 * | 5/2023 | Sivabalan | H04L 45/34 370/254 |
| 2023/0224238 | A1 * | 7/2023 | Saad | H04L 45/12 370/392 |
| 2023/0269167 | A1 * | 8/2023 | Bhargava | H04L 45/02 709/238 |
| 2023/0412492 | A1 * | 12/2023 | Alaettinoglu | H04L 45/28 |
| 2024/0146648 | A1 * | 5/2024 | Alaettinoglu | H04L 43/0811 |
| 2024/0340241 | A1 * | 10/2024 | Alaettinoglu | H04L 45/02 |
| 2025/0133013 | A1 * | 4/2025 | Defilippi | H04L 45/28 |

FOREIGN PATENT DOCUMENTS

| | | | |
|---|---|---|---|
| WO | 2022055861 | A1 | 3/2022 |
| WO | 2023038818 | A1 | 3/2023 |

OTHER PUBLICATIONS

P. Psenak et al., “IGP Flexible Algorithm,” Internet Engineering Task Force (IETF), RFC 9350, ISSN: 2070-1721, Feb. 2023, 42 Pages.

C. Filsfils et al., “Segment Routing Architecture,” Internet Engineering Task Force (IETF), Standards Track, ISSN: 2070-1721, Jul. 2018, 32 Pages.

K. Talaulikar et al., “Border Gateway Protocol—Link State (BGP-LS) Extensions for Flexible Algorithm Advertisement,” Internet Engineering Task Force (IETF), RFC 9351, Standards Track, ISSN: 2070-1721, Feb. 2023, 14 Pages.

* cited by examiner

DOMAIN BORDER ROUTER RESILIENCY WITH SEGMENT COMPACTION

FIELD OF THE DISCLOSURE

The present disclosure relates generally to networking. More particularly, the present disclosure relates to systems and methods for domain Border Router (BR) resiliency with segment compaction in Segment Routing.

BACKGROUND OF THE DISCLOSURE

Segment Routing (SR) is a network routing technology that enables the source of a packet to define the entire route that the packet will follow through the network. This is achieved by embedding a list of instructions—known as segments—into the packet header. Each segment can represent different types of instructions such as routing decisions or specific services that need to be applied to the packet as it travels. These segments are represented by Segment Identifiers (SIDs) and can have local relevance to a specific node or be globally recognized within a Segment Routing domain. The technology simplifies the routing architecture by removing the need to maintain state information across the network, instead centralizing it at the entry point of the routing domain. Segment Routing supports various applications, including traffic engineering, service chaining, and network resiliency. This technology is detailed in Fiflsfils et al., RFC 8402, "Segment Routing Architecture," published by the Internet Engineering Task Force (IETF) in July 2018, the contents of which are incorporated by reference in their entirety.

BRIEF SUMMARY OF THE DISCLOSURE

The present disclosure relates to systems and methods for domain Border Router (BR) resiliency with segment compaction in Segment Routing. As described herein, segment compaction includes Segment Identifier (SID) list compression to minimize the number of segments/SIDs for an already computed path. Typically, with SID list compression, node segments or SIDs are preferred. In multi-domain Segment Routing network, domain Border Routers (BR) are used for resiliency between domains, specifically domain border routers are located at the edges of two adjacent domains. For resiliency with domain border routers, there is a need to use anycast segments or SIDs, instead of a node SID, causing difficulty in segment compaction. Note, segment compaction is performed after path computation. A conventional approach requires addressing Domain Border Routers during path computation, identifying these as part of any constraints in Constrained Shortest Path First (CSPF) calculations. This requires knowledge in advance of the anycast prefixes, and with more and more domains, this becomes difficult to track and manage. The present disclosure provides an approach performing the segment compaction after the path is calculated, and addressing the domain border routers after as well, to provide segment compaction preferring node SIDs along with domain border router resiliency with anycast SIDs.

In various embodiments, the present disclosure includes a method having steps; an apparatus, circuitry, or router configured to implement the steps; and a non-transitory computer-readable medium storing instructions that, when executed, cause one or more processors or circuitry to implement the steps. The steps include obtaining a compressed segment list for a calculated path in a Segment Routing network, wherein the Segment Routing network includes a plurality of domains with the calculated path being through at least two domains, wherein the compressed segment list includes a plurality of Segment Identifiers (SID) each SID identifying a segment, and wherein, when expanded, the compressed segment list matches the calculated path; analyzing the compressed segment list for any domain border routers between two domains of the at least two domains to determine associated anycast SID for the any domain border routers; and utilizing the associated anycast SID in the compressed SID list for resiliency between the two domains.

The analyzing can further includes steps of identifying a domain border router between the two domains; and for the identified domain border router, identifying corresponding one or more domain border routers and determining the associated anycast SID based thereon. In an embodiment, the plurality of Segment Identifiers (SID) include node SIDs. In another embodiment, the plurality of Segment Identifiers (SID) include node SIDs and adjacency SIDs. The steps can further include, prior to the obtaining, performing a path calculation for the calculated path without considering the any domain border routers. The steps can further include, prior to the obtaining and subsequent to the performing, determining the compressed segment list with node SIDs and with zero or more adjacency SIDs. The analyzing the compressed segment list can include identifying the domain border router based on a corresponding node SID in the plurality of SIDs. The steps can further include monitoring advertisements from the Segment Routing network to determine the domain border routers and the associated anycast SIDs.

BRIEF DESCRIPTION OF THE DRAWINGS

The present disclosure is detailed through various drawings, where like components or steps are indicated by identical reference numbers for clarity and consistency.

DETAILED DESCRIPTION OF THE DISCLOSURE

Figure 1:
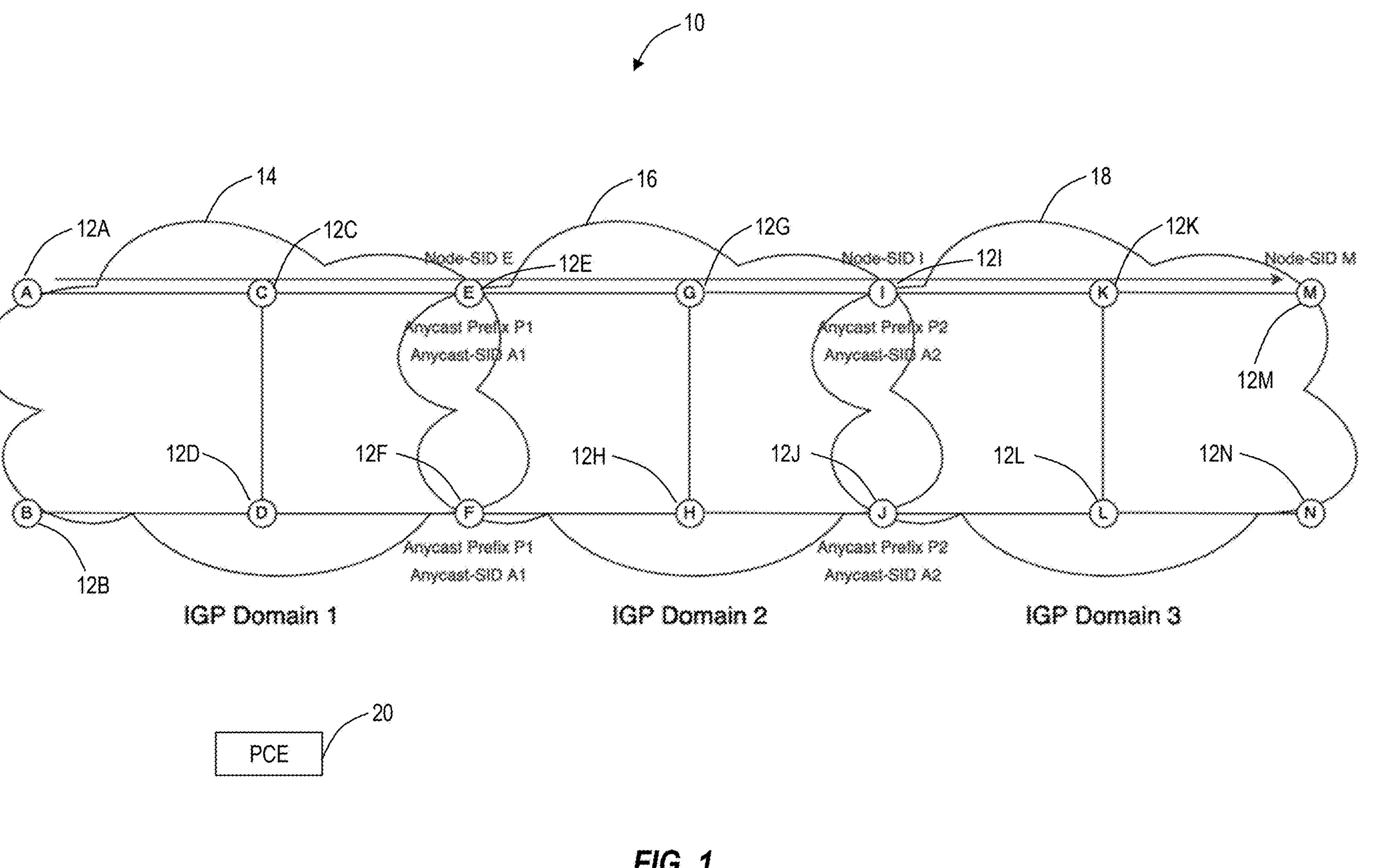
FIG. 1 is a network diagram of a network including network elements illustrating an example path.

Again, the present disclosure relates to systems and methods for domain Border Router (BR) resiliency with segment compaction in Segment Routing. The present disclosure does not require a user to enter specific anycast prefixes. They can calculate the normal path between two endpoints with normal constraints and then rely on domain border router resiliency to identify where resiliency is possible along the computed path, and generate the anycast segments needed. This greatly simplifies deployment of resilient services across Interior Gateway Protocol (IGP) domains by having a Path Computation Element (PCE) automate the end-to-end provisioning process. Generally, the approach includes receiving a computed path, identifying domain border routers on a CSPF calculated path, determining if any anycast prefixes exist advertised by only those domain border routers, and, when there are anycast prefixes, using the anycast SID in the compressed SID list.

Segment Routing Overview

Segment Routing can be applied directly to Multiprotocol Label Switching (MPLS) without altering the forwarding plane. It involves encoding a segment as an MPLS label and arranging an ordered list of segments into a stack of labels. The top label of the stack represents the segment currently being processed, which is removed once completed. Segment Routing is also applicable to the Internet Protocol version 6 (IPv6) architecture by using a new routing extension header as specified in RFC 8754, which introduces the concept of an IPv6 Segment Routing Header (SRH). Here, segments are encoded as IPv6 addresses, and the processing sequence is directed by a pointer in the routing extension header. Segment Routing can extend to Ethernet standards like IEEE 802.1. It offers several advantages, such as scalable policies, ease of integration with IP and Software Defined Networking (SDN) architectures, operational simplicity, and a balance between distributed intelligence and centralized optimization.

In loose source routing like Segment Routing, the source node either selects a path or receives one from an SDN controller, PCE, etc., encoding this path in the packet header as an ordered list of segments. This routing style grants complete control over the path without relying on network state or setup signaling, making it both scalable and simple to deploy. In Segment Routing, each segment (or Segment Identifier, SID) represents a specific instruction executed by a node on incoming packets, which could include directives like forwarding to a specific interface or delivering to a particular service. SIDs come from a global block (SRGB) or a local block (SRLB) and can represent different types of segments like adjacency, prefix, node, binding, and anycast.

Each SID corresponds to a specific action, such as steering traffic through a single-hop adjacency or a multi-hop prefix route. Prefix SIDs, which can be unique within the routing domain, are associated with IP prefixes and can be configured manually or distributed via routing protocols like OSPF or ISIS. Binding segments relate to specific Segment Routing policies, where a Binding SID (BSID) is used to direct packets into these policies. An anycast segment represents a group and is used for load balancing and redundancy/resiliency, directing traffic to the nearest available node in the anycast group. As described herein, an anycast segment is used for two or more domain border routers. Segment Routing Traffic Engineering (SR-TE) restricts flows to specific paths, maintaining flow state only at the ingress nodes. It uses a path computation algorithm to optimize paths according to specific criteria, like link latency, and can be computed at the path's head-end or a PCE depending on the network's scope.

Path Calculation and PCE

Path computation includes determining a list of interfaces in the Segment Routing network between two nodes that meets a set of constraints. A PCE is a processing device that can support path computation. The official definition of a PCE is an entity (component, application, or network node) that is capable of computing a network path or route based on a network graph and applying computational constraints. The PCE is responsible for doing the path computation, such as using CSPF, and then sending appropriate label-stack (SID labels) to the headend node. Then the headend node pushes those segments list labels on the packets. Note, the PCE can be a server, an application, a management system, a controller, etc.

Of note, the present disclosure does not specify how the PCE or the like ultimately calculates the path, i.e., any approach is contemplated. The present disclosure focuses on how to compress a segment list for an already computed path as well as how to support domain border router resiliency in this process.

SID List Compression/Segment Compaction

As described herein, the terms SID list compression and segment compaction are used interchangeably to represent a process of taking an already computed path in a Segment Routing network and determining segments/SIDs to provide a minimal representation where the segments/SIDs match the computed path. Also, those skilled in the art will recognize the term segments and SIDs are similar in that the SID is an identifier for the segment, i.e., a SID list represents all segments in a computed path. The intent of path calculation is for a given computed path to remain on the computed path, especially for Traffic Engineering, whereas the intent with SID list compression is to represent the computed path with as few segments as possible. These two intents are in tension with one another, namely having fewer segments means it is more likely a path chosen by the network would veer from the computed path, and defining the path with a segment for each hop is not compressed, leading to a very large SID stack. A headend router may not be able to push that many SIDs to the packets. Even the highest end routers have a SID depth limitation (say, e.g., on the order of 9-20 SIDs), whereas other routers may have SID depth limitations such as on the order of 3-6 SIDs. Due to hardware limitations, a shorter segment list will be preferred over a longer segment list, since some devices have a small maximum segment depth (MSD) that they support. This is one objective of segment compaction.

One previous example of SID list compression, relative to ring topologies, is described in U.S. patent application Ser. No. 18/131,210, filed Apr. 5, 2023, and entitled "Minimal SID depth for ring topologies in Segment Routing via a PCE and Flex-Algo," the contents of which are incorporated by reference. This includes (1) creation of two Flex-Algo topologies for ring topologies (one in each direction of the ring), and (2) using these topologies to compress SID list when rings (and rings of rings) topologies are present. Here, a single node SID, from a given Flex-Algo, can be used to designate a specific path on a ring. This approach requires ring topologies and the creation of specific Flex-Algo topologies for the ring topologies.

Another example of SID list compression is described in U.S. patent application Ser. No. 18/489,328, filed Oct. 18, 2023, and entitled "Segment compaction in Segment Routing with resiliency to restoration," the contents of which are incorporated by reference. This disclosure provides an approach to determining a segment list in a Segment Routing network after a path has been determined. This segment list optimally addresses segment list depth, resilience to failure, and resilience to repair and other changes, in such a manner that the same path is achieved with the segment list. In an embodiment, the present disclosure builds on this approach to add coverage to anycast SIDs/segments for domain border router resiliency. Of course, the present disclosure contemplates use with other approaches for segment compaction, i.e., is not limited to use with this example of SID list compression.

SID List Compression

The purpose of SID list compression is to create a segment list that, when expanded, matches the path we have calculated.

(a) from a current node that starts with the source node, traversing the computed path to determine a furthest node segment available matching a corresponding section of the computed path;

(b) if a furthest node associated with the furthest node segment is not the current node, utilizing the furthest node segment in the segment list;

(c) if the furthest node is the current node, utilizing an adjacency segment to get to a next node in the computed path; and (d) setting the current node to be the furthest node or the next node, and repeating (a)-(c) until the furthest node or the next node is the destination node.

The following pseudocode describes a general SID list compression algorithm, described in U.S. patent application Ser. No. 18/489,328.

```
// Given a path P from start node S to end node E and base
topology T
C = S
while (C != E) {
  N_furthest = C;
  for (N = C + 1; N <= E; ++N) {
    // Get the SPF path from C to N's node SID (which is SPF
path from C
    // to N)
    P_spf = SPFPath(T, C, N);
    // Get the section of P between C and N
    P_path = PathSection(P, C, N);
    if (P_spf == P_path) {
      N_furthest = N;
      continue;
    }
    else {
      break;
    }
  }
  if (N_furthest != C) {
    // We found the furthest node SID along P whose SPF path
still matches
    // P
    SL.push_back(GetNodeSID(T, N_furthest));
  }
  else {
    // We could not find any node SID to move us along P
    SL.push_back(GetAdjSID(C, C + 1));
  }
}
```

Example Multi-Domain Segment Routing Network

FIG. 1 illustrates an example multi-domain Segment Routing network 10 for illustrating segment compaction after path computation. The Segment Routing network 10 includes various nodes 12A-12N, e.g., network elements, routers, switches, domain border routers, etc., and three example domains 14, 16, 18. The Segment Routing network 10 is a multi-IGP domain and can use Intermediate System-Intermediate System (ISIS) or Open Shortest Path First (OSPF). The nodes include domain border routers 12E, 12F, between the domains 14, 16, and domain border routers 12I, 12J, between the domains 16, 18.

For illustration purposes, assume a PCE 20 has computed a traffic-engineered path through the network; the path it has found is between network elements 12A-12C-12E-12G-12I-12K-12M. If normal segment compaction is used, as described above, the resulting segment list will likely be (Node-SID E, Node-SID I, Node-SID M). Since each IGP domain 14, 16, 18 only has knowledge of nodes and links within its own domain, each segment is responsible for getting traffic from one side of one domain to the other side of that same domain; that border router on the other side of the first domain will then have routing knowledge of the next domain, so the node will be able to use the next segment to route across that next domain. For example, starting at the node 12A, it will only have knowledge of what is in the domain 14, so the node 12A will need to use the Node-SID E to get the path to the node 12E; at the node 12E will also have knowledge of the domain 16, so the node 12E will be able to use Node-SID I to get the path to the node 12I; and so on.

One drawback of using these Node-SIDs is that it causes the segment forwarding to fail if the either one of the nodes 12E, 12I goes down. If the node 12E goes down, for example, it will no longer be advertising the Node-SID for E, so anyone trying to route to that segment will be unable to forward traffic. In such deployments, the network operator would typically provide more than one border router connecting the same two IGP domains, offering resiliency in case of node failure or isolation. All such border routers connecting the same pair of IGP domains 14, 16, 18 would advertise the same anycast prefix, with that anycast prefix now representing connectivity from one IGP domain to the next. The anycast prefix advertisement will also include an Anycast-SID, which allows for Segment Routing to that Anycast-SID to choose whichever advertisement is closer, in the same way normal IP routing to an anycast prefix chooses whichever route is closest. In the example of FIG. 1, nodes 12E, 12F advertise Anycast Prefix P1 with Anycast-SID A1 and nodes I and J advertise Anycast Prefix P2 with Anycast-SID A2.

One way to get the resulting segment list to use anycast SIDs is to include the anycast prefixes as part of the constraints for the path calculation. In the example of FIG. 1, the constraints will need to specifically mention including P1 and P2 along the way to the destination node 12M. That requires the caller (e.g., the user or entity requesting the path and SID list) to have extra knowledge of the anycast prefixes used in the network, which they might not. The more IGP domains 14, 16, 18 present in the network 10 and the more interconnections between different IGP domains 14, 16, 18 at different domain border routers 12E, 12F, 12I, 12J, the more anycast prefixes and SIDs will be present to denote these different combinations, and this overall set of anycast prefixes and SIDs is difficult to track.

The present disclosure removes the need for the caller to enter specific anycast prefixes as part of the path constraints, instead allowing the caller to use their original constraints and then have the PCE 20 infer along the way where anycast prefixes and SIDs are present that give this resiliency to the resulting segment list. In the network 10, where the primary points of failure are at the domain border routers 12E, 12F, 12I, 12J, and where the anycast prefixes and SIDs are configured at the domain border routers 12E, 12F, 12I, 12J to address this issue, we call this domain border router resiliency.

PCE

The PCE 20 is a processing device that handles traffic engineering in Segment Routing. The official definition of a PCE is an entity (component, application, or network node) that is capable of computing a network path or route based on a network graph and applying computational constraints. The PCE 20 is responsible for doing the path computation and then sending appropriate label-stack (SIDs) to the headend node. Then the headend node pushes those segments list labels on the packets. An example embodiment of a PCE can include the processing device illustrated in FIG.

4. Note, the PCE can be a server, an application, a management system, a controller, etc. The present disclosure provides a SID list compaction process that can be used by the PCE 20 or some other device to assign segments to an already computed path.

Process for Domain Border Router Resiliency with SID List Compression

Figure 2:
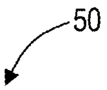
FIG. 2 is a process for domain border router resiliency with SID list compression according to an embodiment of the present disclosure.
Figure 2:
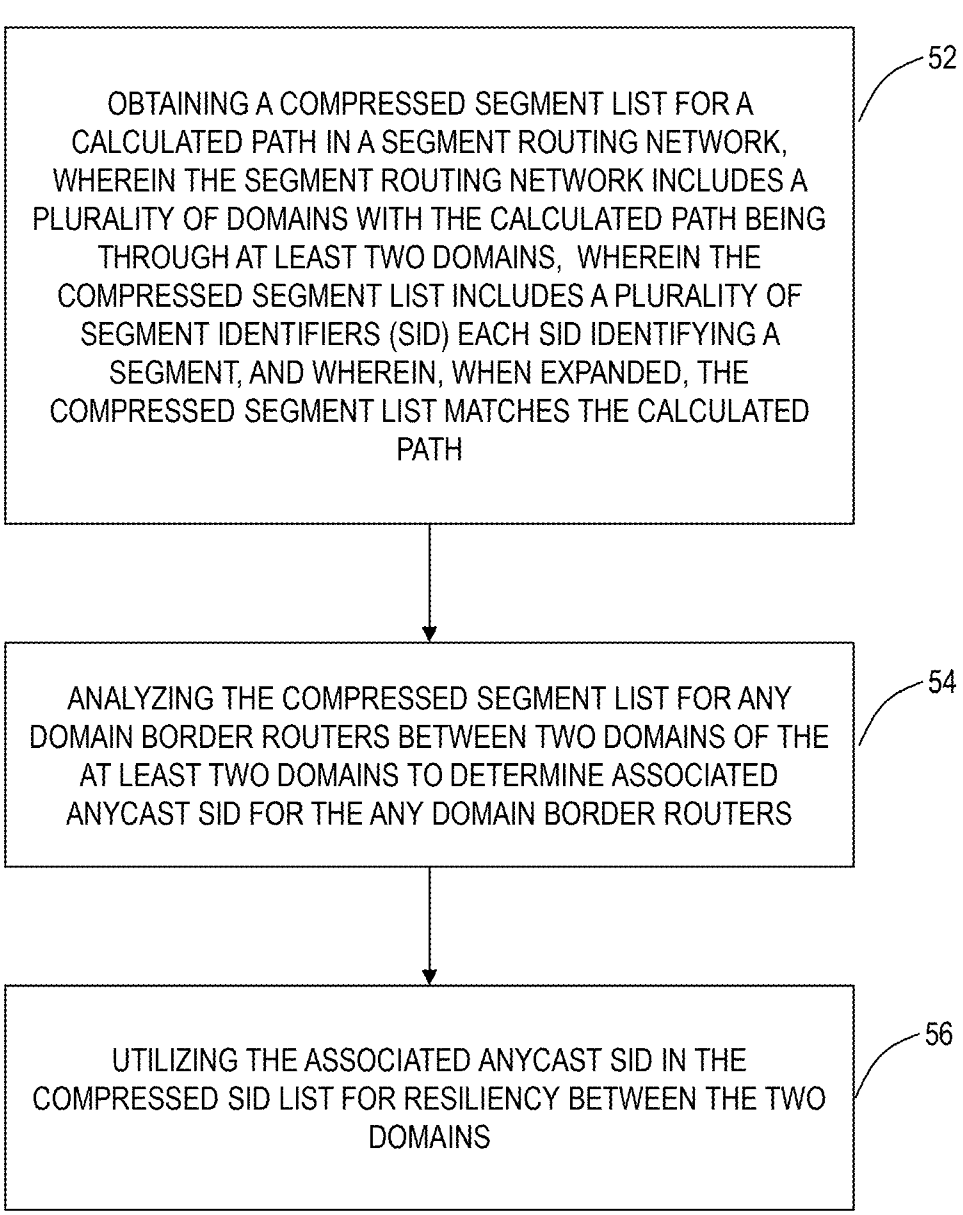

FIG. 2 is a process 50 for domain border router resiliency with SID list compression according to an embodiment of the present disclosure. The process 50 can be realized as a method having steps; via an apparatus such as a processing system disposed in, associated with, or connected to a router, with the processing system including at least one processor configured to implement the steps; and as a non-transitory computer-readable medium storing instructions that, when executed by at least one processor, cause the at least one processor to implement the steps. From a terminology perspective, the terms segment and SID are used somewhat interchangeably, but those skilled in the art recognize a SID is a label or identifier that corresponds to a segment.

The process 50 includes obtaining a compressed segment list for a calculated path in a Segment Routing network from a headend node to an end node, wherein the Segment Routing network includes a plurality of domains with the calculated path being through at least two domains, wherein the compressed segment list includes a plurality of Segment Identifiers (SID) each SID identifying a segment, and wherein, when expanded, the compressed segment list matches the calculated path (step 52); analyzing the compressed segment list for any domain border routers between two domains of the at least two domains to determine associated anycast SID for the any domain border routers (step 54); and utilizing the associated anycast SID in the compressed SID list for resiliency between the two domains (step 56).

The analyzing step 54 further includes steps of identifying a domain border router between the two domains; and, for the identified domain border router, identifying corresponding one or more domain border routers and determining the associated anycast SID based thereon. The plurality of Segment Identifiers (SID) include node SIDs and zero or more adjacency SIDs.

The process 50 can further include, prior to the obtaining, performing a path calculation for the calculated path without considering the any domain border routers. The process 50 can further include, prior to the obtaining and subsequent to the performing, determining the compressed segment list with node SIDs and with zero or more adjacency SIDs, if needed. In an embodiment, the process 50 is performed separately from the path computation and the SID list compression. In another embodiment, the process 50 is performed with the SID list compression. In a further embodiment, the process 50 is performed with the path computation and the SID list compression, e.g., the process 50 is performed after path computation, but can be performed by the same entity.

The analyzing the compressed segment list can include determining the any domain border routers based on a corresponding node SID in the plurality of SIDs. The process 50 can further include monitoring advertisements from the Segment Routing network to determine the domain border routers and the associated anycast SIDs.

The following includes pseudocode illustrating an example implementation of the process 50. Those skilled in the art will appreciate other implementations are also contemplated.

```
P = {path};
for each (node N in P) {
  // If the current node is a domain border router
  if (N.isDomainBorderRouter( )) {
    // Get the domains that the path hop coming into N traversed
    // and the domains that the path hop leaving N will traverse
    currDomains = N.incomingInterfaceDomains( );
    nextDomains = N.outgoingInterfaceDomains( );
    // For each combination of domains
    for each (currDomain in currDomains, nextDomain in
nextDomains) {
      // Get all domain border routers of the previous domain
      dbrs = currDomain.getDomainBorderRouters( );
      // For each of those domain border routers,
      // get all domains that domain router is located
      for each (dbr in dbrs) {
        dbrAreas[dbr] = dbr.getAllDomains( );
      }
      // Create another set of domains containing only the
      // current and next domains
      pathDomains.insert(currDomain);
      pathDomains.insert(nextDomain);
      // For each domain border routers, see if it participates
      // in both the previous and current domains
      for each ((dbr, domains) in dbrDomains) {
        commonDomains = intersect(pathDomains, domains);
        if (common == pathDomains) {
          similarDBRs.insert(dbr);
        }
      }
      // See if there is an anycast prefix/SID that is
      // advertised by exactly the same set of nodes as those
      // domain border routers participating in
      // both topologies
      if (AnycastMonitor.matchNodes(currDomain, similarDBRs,
                                    anycastPrefix,
anycastSID)) {
        // If so, generate an anycast segment to that anycast
        // SID
        ...
      }
    }
  }
  // If nothing was found regarding anycast segments,
  // do usual segment generation with Node-SIDs and Adj-SIDs
  ...
}
```

In this example implementation, the PCE starts by iterating through all of the nodes N in path P. For each node, the PCE checks if it is a domain border router; if it is, the PCE needs to investigate further, since it is at the domain border routers where the network might have anycast prefixes and SIDs that the PCE needs to use. The PCE retrieves the domains used by the incoming hop into N in the path (currDomains) and the domains used by the outgoing hop from N in the path (nextDomains); this is because the PCE needs to know which domains the domain border router is connecting. The PCE looks at all possible combinations of domains from each of these sets (currDomain and nextDomain). For currDomain, the PCE gets all of the known domain border routers in that domain (dbrs), and for each such domain border router, the PCE finds all of the domains that that domain border router is in (dbrAreas). Using dbrAreas, for each domain border router in dbrs the PCE sees which of the domain border routers have domain sets that include both the current and next domain (similarDBRs). The PCE then looks at the anycast prefixes in the network to find those advertised by the nodes in similarDBRs; if the PCE finds such an anycast prefix, the PCE can generate a segment using the anycast prefix's Anycast-SID; if not, the PCE continues its usual segment generation creating Node-SIDs and Adj-SIDs (adjacency SIDs).

The idea behind similarDBRs is that the PCE should choose those domain border routers who connect the same two domains that the path was traversing between. For these other domain border routers to provide resiliency, they need to be reachable in the domain the path is coming from, which means they must be in currDomain, and they must be able to reach whatever the next segment in the segment list will be, which means they must also be in nextDomain. similarDBRs helps the PCE identify exactly which set of nodes traffic must attempt to reach with the anycast segment, should the PCE choose to use it.

The PCE then looks up in the network to see if there are anycast prefixes advertised by those nodes and only those nodes in similarDBRs. The resulting anycast segment, should the PCE find one, must only take the traffic to nodes in similrDBRs, or else the PCE cannot trust where subsequent segments will take traffic. If the PCE accidentally includes an internal router in IGP Domain 1 in the set, that router will not have visibility into IGP Domain 2, and thus that router will not be able to forward traffic to the next segment in the segment list. If the PCE accidentally includes a domain border router between IGP Domain 1 and IGP Domain 4, but not IGP Domain 2, in the set, that router will also not have visibility into IGP Domain 2, so that router will have the same issue.

This approach assumes the existence of such anycast prefixes and SIDs on the domain border routers for the PCE to find and use in anycast segment generation. Even if these anycast prefixes and SIDs are not already present in the network, the work done by this solution gives helpful information for where they could be provisioned to make anycast segment generation possible. At each domain border router that the PCE encounters along the path, the PCE will determine the similarDBRs set for that domain border router; these are the devices that the PCE needs to be advertising the same anycast prefix and SID for segment generation to work. Once the PCE determines this similarDBRs set, it could notify a controller in the network to provision an anycast prefix and SID on those devices and then use that anycast information itself to generate an anycast segment for that anycast prefix.

Referring back to FIG. 1, the resulting segment list will be (A1, A2, M). Anycast segments A1 and A2 help the traffic get to the Domain 14/Domain 16 border and Domain 16/Domain 18 border, respectively. Starting at the node 12A, traffic will follow A1 until it gets to the closest domain border router advertising P1. Barring any failures, the closest such domain border router is the node 12E, and the path will be between the nodes 12A→12C→12E. At the node 12E, traffic will follow A2 until it gets to the closest domain border router advertising P2. Barring any failures, the closest such domain border router is the node 12I, and the path will be between the nodes 12E→12G→12I. At the node 12I, traffic will follow the node SID M to get to the node 12M. Barring any failures, the path will be between the nodes 12I→12K→12M.

Example Node

Figure 3:
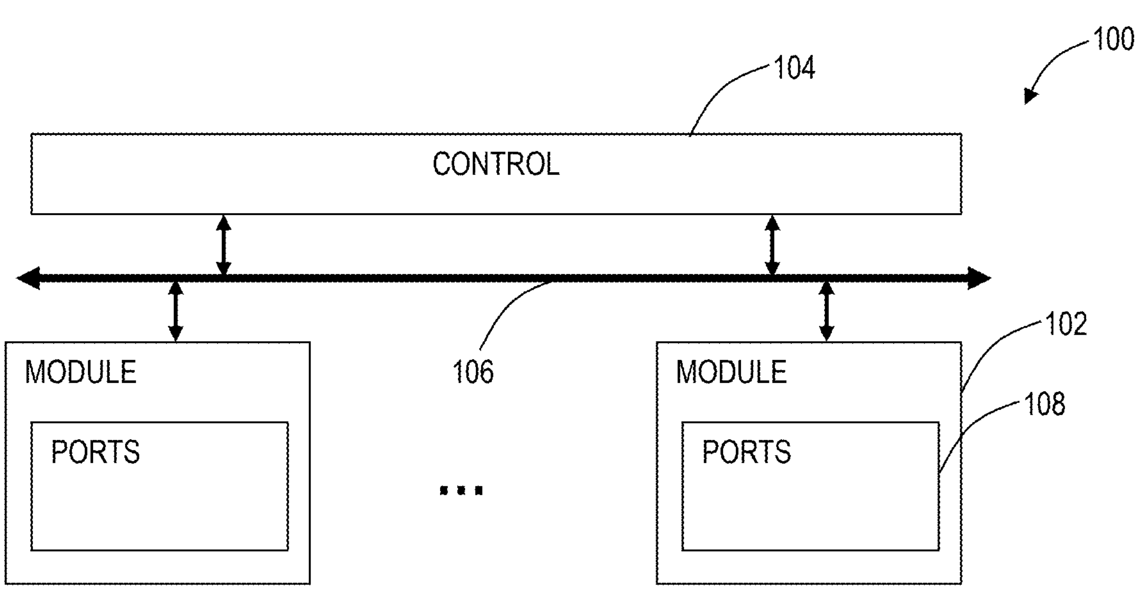
FIG. 3 is a block diagram of a router, depicted in a simplified functional format.

FIG. 3 is a block diagram of a router 100, depicted in a simplified functional format. It is important to note that a more practical design of this router would likely include additional components and processing logic to accommodate standard operating features, which are not detailed here. The router 100 may represent any network element compatible with Segment Routing, and includes various interconnected modules, such as modules 102 and 104, via an interface 106. These modules, also known as blades or line cards, are typically mounted on the chassis of a data switching device. Each module can house numerous electronic or optical devices on a circuit board, complete with various interconnects, including interfaces to the chassis itself.

Specifically, the diagram illustrates two types of modules: line modules 102, which feature multiple Ethernet ports for external connections, and a control module 104. The line modules facilitate data traffic switching between ports via a switching fabric, integrated across the modules, potentially centralized in a separate unit or module, as well as a combination. This switching fabric includes hardware, software, and firmware that routes incoming data to the appropriate port. The control module 104 is equipped with a microprocessor, memory, software, and a network interface to manage operations such as configuration and monitoring of the router 100. It may also communicate with external network management systems or databases that handle provisioning and operational data.

Lastly, while FIG. 3 provides a basic view, those skilled in the art will understand that the router 100 could include additional components or be configured differently, such as in a distributed arrangement or as an integrated, rack-mounted unit (often referred to as a "pizza-box" configuration). This depiction in FIG. 3 is intended to convey functional aspects, with actual hardware implementations varying widely.

Example Processing Device

Figure 4:
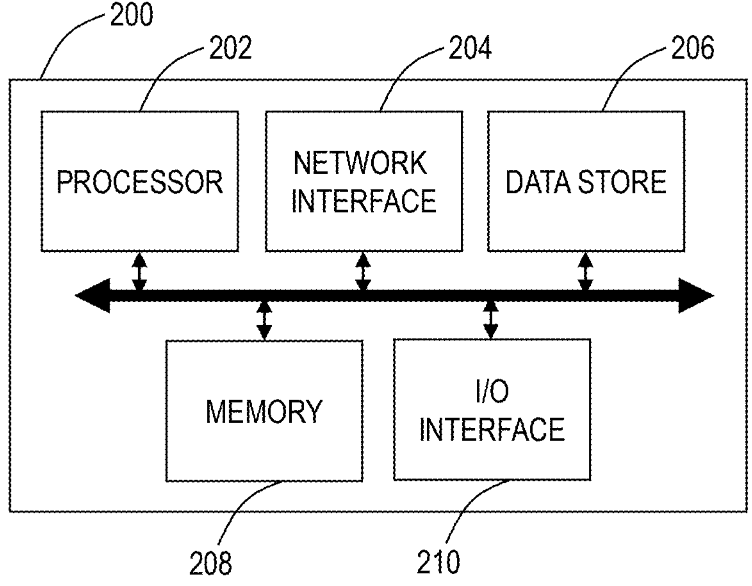
FIG. 4 is a block diagram of an example processing device.

FIG. 4 is a block diagram of an example processing device 200. The processing device 200 may be integrated within the router 100 or function as a standalone unit connected to the router 100, including the PCE 20. It may also be known as an apparatus, a control module, shelf controller, shelf processor, or system controller. The core of the processing device 200 is a processing unit 202, a hardware unit that runs software instructions. The processing unit 202 could be one or more custom or commercially available processors. During operation, the processing unit 202 executes software from memory, manages data communication with the memory, and controls the processing device 200 operations based on the software.

The processing device 200 also features several components connected to the processing unit 202: a network interface 204, a data store 206, memory 208, and an I/O interface 210. The network interface 204, possibly an Ethernet device, allows the processing device 200 to communicate over a data network and includes necessary connections for address, control, and data communication. The data store 206 stores various types of data such as control plane information and Operations, Administration, Maintenance, and Provisioning (OAM&P) data, and may include both volatile (e.g., RAM) and nonvolatile (e.g., ROM, hard drives) memory elements. Similarly, the memory 208 includes volatile and nonvolatile storage media, potentially employing a distributed architecture where components are located remotely but accessible by the processing unit 202. The I/O interface facilitates communication between processing device 200 and external devices. When the processing device 200 is the PCE 20, the network interface 204 is communicatively coupled to the Segment Routing network 10.

Processing Circuitry and Non-Transitory Computer-Readable Mediums

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); Programmable Logic Device (PLD), or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each equipped with processing circuitry. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

Conclusion

As used herein, including in the claims, the phrases "at least one of" or "one or more of" a list of items refer to any combination of those items, including single members. For example, "at least one of: A, B, or C" covers the possibilities of: A only, B only, C only, a combination of A and B, a combination of A and C, a combination of B and C, and a combination of A, B, and C. Additionally, the terms "comprise," "comprises," "comprising," "include," "includes," and "including" are intended to be non-limiting and open-ended. These terms specify essential elements or steps but do not exclude additional elements or steps, even when a claim or series of claims includes more than one of these terms.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. That is, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

Although operations, steps, instructions, and the like are shown in the drawings in a particular order, this does not imply that they must be performed in that specific sequence or that all depicted operations are necessary to achieve desirable results. The drawings may schematically represent example processes as flowcharts or flow diagrams, but additional operations not depicted can be incorporated. For instance, extra operations can occur before, after, simultaneously with, or between any of the illustrated steps. In some cases, multitasking and parallel processing might be beneficial. Furthermore, the separation of system components described should not be interpreted as mandatory for all implementations, as the program components and systems can be integrated into a single software product or distributed across multiple software products.

What is claimed is:

1. A non-transitory computer-readable medium storing instructions that, when executed, cause one or more processors to execute steps of:

performing a path calculation to determine a calculated path in a Segment Routing network without considering any domain border routers, wherein the Segment Routing network includes a plurality of domains with the calculated path being through at least two domains;

obtaining a compressed segment list for the calculated path, wherein the compressed segment list includes a plurality of Segment Identifiers (SID) each SID identifying a segment, and wherein, when expanded, the compressed segment list matches the calculated path;

analyzing the compressed segment list for any domain border routers between two domains of the at least two domains to determine associated anycast SID for the any domain border routers, wherein the analyzing includes (i) identifying, from the calculated path, a domain border router between a first domain and a second domain and identifying one or more corresponding domain border routers that participate in both the first domain and the second domain, and (ii) monitoring advertisements in the Segment Routing network to determine an anycast prefix and a corresponding anycast SID that are advertised by exactly the corresponding domain border routers; and utilizing the associated anycast SID in the compressed SID list for resiliency between the two domains, wherein utilizing includes replacing a node SID for the domain border router in the compressed segment list with the anycast SID.

2. The non-transitory computer-readable medium of claim 1, wherein the analyzing further includes steps of identifying a domain border router between the two domains; and for the identified domain border router, identifying corresponding one or more domain border routers and determining the associated anycast SID based thereon.

3. The non-transitory computer-readable medium of claim 2, wherein the analyzing the compressed segment list includes identifying the domain border router based on a corresponding node SID in the plurality of SIDs.

4. The non-transitory computer-readable medium of claim 1, wherein the plurality of Segment Identifiers (SID) include node SIDs.

5. The non-transitory computer-readable medium of claim 1, wherein the plurality of Segment Identifiers (SID) include node SIDs and adjacency SIDs.

6. The non-transitory computer-readable medium of claim 1, wherein the steps further include
prior to the obtaining and subsequent to the performing, determining the compressed segment list with node SIDs and with zero or more adjacency SIDs.

7. The non-transitory computer-readable medium of claim 1, wherein the steps further include
monitoring advertisements from the Segment Routing network to determine the domain border routers and the associated anycast SIDs.

8. A method comprising steps of:
performing a path calculation to determine a calculated path in a Segment Routing network without considering any domain border routers, wherein the Segment Routing network includes a plurality of domains with the calculated path being through at least two domains;
obtaining a compressed segment list for the calculated path, wherein the compressed segment list includes a plurality of Segment Identifiers (SID) each SID identifying a segment, and wherein, when expanded, the compressed segment list matches the calculated path;
analyzing the compressed segment list for any domain border routers between two domains of the at least two domains to determine associated anycast SID for the any domain border routers, wherein the analyzing includes (i) identifying, from the calculated path, a domain border router between a first domain and a second domain and identifying one or more corresponding domain border routers that participate in both the first domain and the second domain, and (ii) monitoring advertisements in the Segment Routing network to determine an anycast prefix and a corresponding anycast SID that are advertised by exactly the corresponding domain border routers; and
utilizing the associated anycast SID in the compressed SID list for resiliency between the two domains, wherein utilizing includes replacing a node SID for the domain border router in the compressed segment list with the anycast SID.

9. The method of claim 8, wherein the analyzing further includes steps of
identifying a domain border router between the two domains; and
for the identified domain border router, identifying corresponding one or more domain border routers and determining the associated anycast SID based thereon.

10. The method of claim 9, wherein the analyzing the compressed segment list includes identifying the domain border router based on a corresponding node SID in the plurality of SIDs.

11. The method of claim 8, wherein the plurality of Segment Identifiers (SID) include node SIDs.

12. The method of claim 8, wherein the plurality of Segment Identifiers (SID) include node SIDs and adjacency SIDs.

13. The method of claim 8, wherein the steps further include
prior to the obtaining and subsequent to the performing, determining the compressed segment list with node SIDs and with zero or more adjacency SIDs.

14. The method of claim 8, wherein the steps further include
monitoring advertisements from the Segment Routing network to determine the domain border routers and the associated anycast SIDs.

15. An apparatus comprising:
one or more processors;
a network interface communicatively coupled to a Segment Routing network; and
memory storing instructions that, when executed, cause the one or more processors to
perform a path calculation to determine a calculated path in a Segment Routing network without considering any domain border routers, wherein the Segment Routing network includes a plurality of domains with the calculated path being through at least two domains,
obtain a compressed segment list for the calculated path, wherein the compressed segment list includes a plurality of Segment Identifiers (SID) each SID identifying a segment, and wherein, when expanded, the compressed segment list matches the calculated path,
analyze the compressed segment list for any domain border routers between two domains of the at least two domains to determine associated anycast SID for the any domain border routers, wherein the analyzing includes (i) identifying, from the calculated path, a domain border router between a first domain and a second domain and identifying one or more corresponding domain border routers that participate in both the first domain and the second domain, and (ii) monitoring advertisements in the Segment Routing network to determine an anycast prefix and a corresponding anycast SID that are advertised by exactly the corresponding domain border routers, and
utilize the associated anycast SID in the compressed SID list for resiliency between the two domains, wherein utilizing includes replacing a node SID for the domain border router in the compressed segment list with the anycast SID.

16. The apparatus of claim 15, wherein the compressed segment list is analyzed by
identify a domain border router between the two domains, and
for the identified domain border router, identify corresponding one or more domain border routers and determining the associated anycast SID based thereon.

17. The apparatus of claim 15, wherein the plurality of Segment Identifiers (SID) include node SIDs.

18. The apparatus of claim 15, wherein the memory storing instructions that, when executed, further cause the one or more processors to
monitor advertisements from the Segment Routing network to determine the domain border routers and the associated anycast SIDs.

* * * * *